Figure 1:
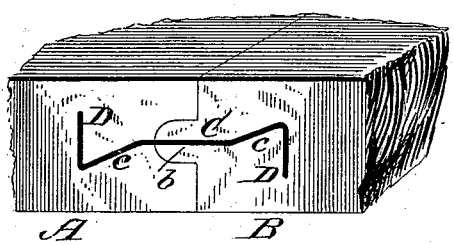

(No Model.)

G. G. WYLAND.
METAL FASTENING DEVICE.

No. 553,886. Patented Feb. 4, 1896.

Witnesses
C. J. Williamson
J. M. Copenhaver

Inventor
George Gilbert Wyland
per Chas. H. Fowler
Attorney.

UNITED STATES PATENT OFFICE.

GEORGE GILBERT WYLAND, OF WILLIAMSPORT, PENNSYLVANIA.

METAL FASTENING DEVICE.

SPECIFICATION forming part of Letters Patent No. 553,886, dated February 4, 1896.

Application filed August 30, 1895. Serial No. 560,973. (No model.)

*To all whom it may concern:*

Be it known that I, GEORGE GILBERT WYLAND, a citizen of the United States, residing at Williamsport, in the county of Lycoming and State of Pennsylvania, have invented certain new and useful Improvements in Metal Fastening Devices; and I do hereby declare that the following is a full, clear, and exact description of the same, reference being had to the annexed drawings, making a part of this specification, and to the letters of reference marked thereon.

The present invention has for its object to provide an effective metal fastening device that will securely hold together the joints in the construction of wooden boxes and for other purposes where a close and tight joint is desirable; and it consists in a device constructed substantially as shown in the drawings and hereinafter described and claimed.

Figure 2:
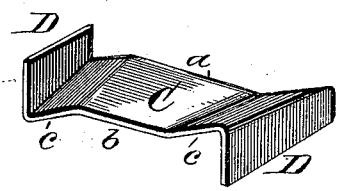
Figure 3:
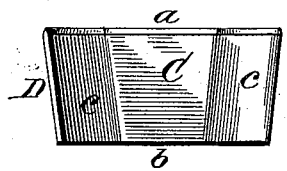
Figure 4:

Figure 1 of the drawings is a perspective view showing a joint held together by the improved fastening device; Fig. 2, a perspective view of the fastening device on an enlarged scale; Fig. 3, a plan view thereof; Fig. 4, an end view of the fastener.

In the accompanying drawings, A B represent the two adjoining portions of a boxboard or other object to illustrate the application of the fastening device thereto.

The fastening device is constructed from a rectangular piece of sheet metal and bent in the form shown in Fig. 2 of the drawings. The central portion or body C is of keystone shape, being larger or longer at its driving edge *a* and decreasing in width as it approaches the opposite edge *b*. The body portion C is braced and strengthened by the angular extensions *c*, said extensions having a slight bend in opposite directions and terminating in wedge shape or tapering flanges D. These flanges extend in opposite directions and taper throughout their length, and the portion of the fastening between the flanges is also tapering, which taper is in an opposite direction to the taper of said flanges, thus forming a compound wedge when driven into the wood or other material. The flanges D are not only tapering in a direction toward their length and extend in opposite directions, but are substantially parallel and incline toward each other at the top, making a very effective and strong fastening to hold the joint together. The flanges D, extending in opposite directions, bring them in line with the central part of the fastener, so that the pressure or frictional contact with the wood will be equal and uniform upon both sides of the body portion of the device.

The driving edge may be sharp, to enable the fastening device to be more easily driven into the wood, although this is left discretionary with the manufacturer.

When driven into the wood, the tapering portion of the fastening device between the flanges D will draw the joint together, and the flanges D tapering in opposite direction to the taper of the device form a compound wedge. The taper of the flanges in opposite direction, as above stated, compels them to work their way into the wood and form a perfectly tight joint.

Having now fully described the invention, what I claim as new, and desire to secure by Letters Patent, is—

The fastening device herein described, formed from a piece of sheet metal, having a central body portion C, the two angular extensions *c*, and the two tapering flanges, turned outwardly in opposite directions but inclined inwardly toward each other; the driving edge *a* of the central portion being longer than the driving edge *b*, whereby the portion C is made approximately wedge-shaped, and the extensions *c* having a slight bend in opposite directions, substantially as described and shown.

In testimony that I claim the above I have hereunto subscribed my name in the presence of two witnesses.

GEORGE GILBERT WYLAND.

Witnesses:
ROBT. B. FLICK,
JOHN P. MCNERNEY.